Nov. 3, 1931.  E. A. ROSSNER  1,830,337

RING

Filed Sept. 10, 1925

INVENTOR.
EUGENE A. ROSSNER
BY
ATTORNEY.

Patented Nov. 3, 1931

1,830,337

UNITED STATES PATENT OFFICE

EUGENE A. ROSSNER, OF DETROIT, MICHIGAN

RING

Application filed September 10, 1925. Serial No. 55,456.

My invention relates to a new and useful improvement in a ring, and has for its object the provision of a ring made from a composition such as pressed hard rubber, or the like, and so constructed as to be economical of manufacture, highly attractive, ornamental in appearance, and durable in its structure.

It is an object of the present invention to provide a ring made from this material having a reinforcement extended through the annular portion for strengthening the annular portion and serving to retain in mounted position the ornamental portions secured thereon.

It is another object of the present invention to provide a ring formed from a composition of this class, having an annular portion bearing an ornamental portion formed from a plurality of layers to provide a contrast in colors for adding to the attractive and ornamental features of the ring.

Other objects will appear hereinafter.

The invention consists in the combination and arrangement of parts hereinafter described and claimed.

Figure 1:
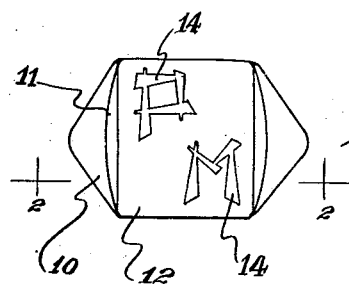
Figure 2:
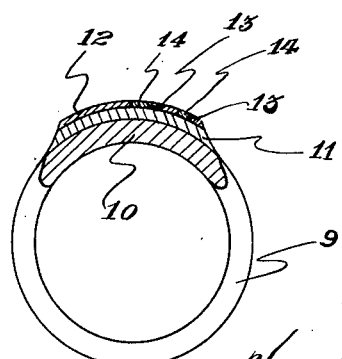
Figure 3:
Figure 4:
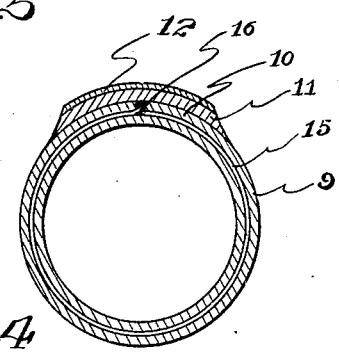

The invention will be best understood from a reference to the accompanying drawings, which form a part of this specification and in which, Fig. 1 is a front elevational view of the invention, Fig. 2 is a sectional view taken on substantially line 2—2 of Fig. 1, showing parts in section and parts in elevation, Fig. 3 is a side elevational view of the invention, Fig. 4 is a sectional view taken on substantially line 4—4 of Fig. 3.

As shown in the drawings, the ring, which is made preferably from hard rubber and moulded to the desired shape, comprises an annular portion 9 having formed integral therewith a flattened out portion 10, which projects at opposite sides of the annular portion. As shown in Fig. 3, positioned on the portion 10, and preferably vulcanized thereon, so as to be securely fastened is a layer 11, which is slightly shorter than the portion 10, and its end edges are beveled to provide a larger exposed area than would be the case were these edges cut squarely. This layer 11 is of a different color than the annular portion 9 and the portion 10. If desired, the portions 9 and 10 may be made from black pressed rubber with a high gloss and the layer 11 from a pink layer of rubber. Secured on the outer surface of the layer 11, also, preferably by vulcanizing, is a layer 12, which is slightly shorter than the layer 11, to provide a continuance of the ornamental portion mounted on the portion 10. This layer 12 is preferably of the same color as the annular portion 9 and the ornamental supporting portion 10. Formed in the layer 12 are dove-tailed grooves 13 in which may be positioned, by inlaying, metallic letters 14 having the sides thereof beveled, so that the inlaid letters, or ornamental designs are securely locked in position in the layer 12. If desired, these letters or ornamental designs 14 may be inserted and the layer 11 moulded around them and vulcanized, or otherwise securely fastened, to the layer 11 at the same time. Extending throughout the annular portion 9 of the ring and projecting upwardly into the portion 10 is a wire reinforcement 15. As shown in Fig. 4, the ends 16 of the wire 15 are twisted so as to extend slightly into the portion 10. The use of the reinforcement in this manner serves to strengthen the ring and prevent its breaking at that portion, namely, the annular portion 9, which is most fragile.

With a ring constructed in this manner, there is provided a durable and cheaply constructed ring of a highly pleasing and ornamental appearance.

While I have illustrated and described the preferred form of construction, I do not wish to limit myself to the precise form of structure shown, but desire to avail myself of such variations and modifications as come within the scope of the appended claims.

Having thus described my invention, what I claim as new and desire to secure by Letters Patent is:

1. A ring of the class described, comprising: an annular portion; a supporting portion of vulcanizable material on said annular portion; a layer of material fused on the outer surface of said supporting portion, said layer varying in color from the remainder of said ring; and a layer of material fused on the outer surface of said first mentioned layer and varying in color therefrom.

2. A ring comprising an annular portion of vulcanizable material; an ornament forming portion mounted on said portion and comprising a plurality of layers of different colors of vulcanizable material vulcanized together, the edges in said layers being exposed and presenting a contrast in color.

3. In a ring of the class described: an ornament portion comprising a plurality of layers of vulcanizable material vulcanized together, said layers being of different sizes and different colors and having their edges exposed for effecting a color contrast.

In testimony whereof, I have signed the foregoing.

EUGENE A. ROSSNER.